United States Patent [19]

Shimizu

[11] Patent Number: 4,896,974
[45] Date of Patent: Jan. 30, 1990

[54] SPHERICAL SPACER OF A CROSSED ROLLER BEARING ASSEMBLY

[75] Inventor: Toshiaki Shimizu, Yokohama, Japan

[73] Assignee: Nippon Thompson Co., Ltd., Tokyo, Japan

[21] Appl. No.: 289,870

[22] Filed: Dec. 22, 1988

[30] Foreign Application Priority Data

Dec. 23, 1987 [JP] Japan ................... 62-323815

[51] Int. Cl.$^4$ ............................................ F16C 19/40
[52] U.S. Cl. ................................... 384/47; 384/44; 384/447; 384/551; 384/552; 384/619
[58] Field of Search ............ 384/47, 551, 552, 44, 384/447, 619

[56] References Cited

U.S. PATENT DOCUMENTS

| | | | |
|---|---|---|---|
| 4,588,311 | 5/1986 | Heier et al. | 384/551 |
| 4,687,345 | 8/1987 | Geka | 384/47 |
| 4,746,228 | 5/1988 | Shimo | 384/44 |
| 4,795,277 | 1/1989 | Colanzi | 384/447 |

Primary Examiner—Lenard A. Footland
Attorney, Agent, or Firm—Skjerven, Morrill, MacPherson, Franklin & Friel

[57] ABSTRACT

A crossed roller rolling contact bearing assembly includes a pair of first and second members which move relative to each other, a guide channel defined between the first and second members and a plurality of rollers provided in the guide channel in a crossed arrangement with a spacer interposed between any two adjacent rollers. The spacer has a generally spherical outer peripheral surface and a pair of recessed, arc-shaped guide surfaces which have generatrix lines extending perpendicular to each other. Becuase of the spherical outer shape of the spacer, a generally wedge-shaped space is defined between the roller and the spacer so that a quantity of lubricant may be reserved therein to keep the guide channel sufficiently lubricated at all times.

8 Claims, 3 Drawing Sheets

SPHERICAL SPACER OF A CROSSED ROLLER BEARING ASSEMBLY

BACKGROUND OF THE INVENTION

1. Field of the Invention

This invention generally relates to a crossed roller bearing assembly, and, in particular, to a spacer for use in such a crossed roller bearing assembly.

2. Description of the Prior Art

A crossed roller rolling contact bearing assembly is well known in the art, and it includes a pair of moving members which move relative to each other and which are formed with guide grooves to define a guide channel in which a plurality of rollers are provided in a crossed arrangement. The guide channel is typically defined in the form of an endless loop. In such a crossed roller bearing assembly, any two adjacent rollers are disposed in a crossed arrangement so that the axis of one of the rollers extends in a direction perpendicular to the axis of each of the two adjacent rollers on both sides when viewed in a longitudinal direction of a guide channel in which the rollers are provided. Since two adjacent rollers are in a crossed arrangement, they are rather unstable in motion so that it has been proposed to provide a spacer between two such adjacent rollers to provide stability to the motion of each of the rollers. Such a spacer for use in a crossed roller bearing assembly is, for example, disclosed in Japanese Patent Post-examination Publication No. 60-25653, Japanese Utility Model Laid-open Publication No. 59-1928 and U.S. Pat. No. 4,479,683.

The prior art spacers proposed, for example, in the above-mentioned patents for use in a crossed roller rolling contact bearing assembly typically have such overall outer shapes as square pillars, cylinders and discs. The prior art spacers are typically so structured to fill almost all of the space defined between two adjacent rollers. Such a prior art structure is advantageous from the viewpoint of providing an increased stability to each of the rollers; however, it also presented several disadvantages, such as an increased sliding resistance and difficulty in maintaining a lubricant, in particular grease of high viscosity, on the guide grooves along which the rollers roll. For this reason, there tended to occur a lubricant scarce condition during operation and in the worst case the bearing could be burned out or frozen in a short period of time.

SUMMARY OF THE INVENTION

In accordance with the present invention, there is provided a spacer for use in a crossed roller bearing assembly as sandwiched between two adjacent rollers, which spacer is generally spherical in outer shape and formed with a pair of recessed, arc-shaped guide surfaces extending perpendicular to each other on opposite sides for partly receiving therein two adjacent rollers in a crossed arrangement. The crossed roller bearing assembly may be of the rotating type including a pair of inner and outer rings which rotate relative to each other and of the linear motion type in which a slider moves relative to a straight rail. A guide channel having a generally square cross section and typically in the form of an endless loop is defined in the crossed roller bearing assembly and a plurality of rollers are provided in the guide channel such that any two adjacent rollers are in a crossed arrangement. And, a spacer of the present invention is interposed between any two adjacent rollers.

In an application to a rotating type crossed roller bearing assembly having a pair of inner and outer rings, each of the recessed, arc-shaped guide surfaces of the present spacer is inclined at a predetermined angle with respect to a predetermined center line of the spacer. Preferably, the present spacer is provided with a marker at a predetermined position on its outer surface to thereby indicate the orientation of the spacer. Such a marker may be preferably formed by a local flat area.

In the preferred embodiment, the present spacer is provided with a pocket or a hole at the center to thereby serve as a reservoir for reserving therein a quantity of lubricant, such as oil and/or grease.

It is therefore a primary object of the present invention to obviate the disadvantages of the prior art as described above and to provide an improved spacer for use in a crossed roller bearing assembly.

Another object of the present invention is to provide an improved spacer capable of providing an excellent lubricating function to a crossed roller bearing assembly.

A further object of the present invention is to provide an improved spacer for providing a stable and smooth rolling action to the rollers of a crossed roller bearing assembly.

A still further object of the present invention is to provide an improved crossed roller bearing assembly smooth in operation, thus high in performance, long in service life.

Other objects, advantages and novel features of the present invention will become apparent from the following detailed description of the invention when considered in conjunction with the accompanying drawings.

DESCRIPTION OF THE PREFERRED EMBODIMENTS

Broadly stated, in accordance with the present invention, since spherical spacers and cylindrical rollers are combined and alternately arranged, spaces generally wedge-shaped when viewed in a transverse direction to an alternate series of spacers and rollers are provided between two adjacent roller and spacer. Such spaces are sufficient to maintain therein a quantity of lubricant, in particular grease of high viscosity, to thereby allow to constantly keep the surface of a guide channel defined by a pair of guide grooves well lubricated. If desired, a notch may be provided at least at one end of the recessed, arc-shaped guide surface in its longitudinal direction to thereby reduce the area of a contact surface with the associated roller and thus the sliding resistance between the associated spacer and the roller. Moreover, since the present spacer is generally spherical in outer shape, it defines a point contact with the surface of the guide channel rather than a line contact as in the prior art so that the sliding contact between the present spacer and the guide surface is further reduced to provide an even smoother motion.

Figure 1:
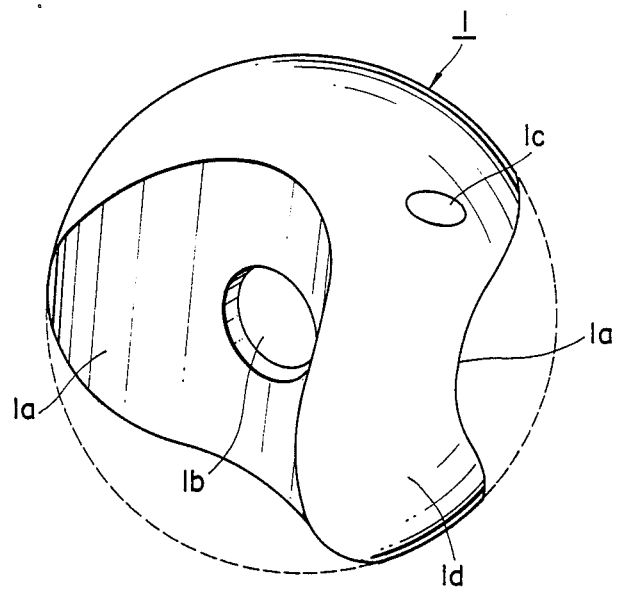
FIG. 1 is a schematic illustration showing in perspective view the overall structure of a spherical spacer for use in a crossed roller bearing assembly constructed in accordance with one embodiment of the present invention.

Referring now to FIG. 1, there is schematically shown a spacer 1 for use in a crossed roller rolling contact bearing assembly constructed in accordance with one embodiment of the present invention. As shown, the present spacer 1 may be considered as being formed from a spherical body having a diameter slightly smaller than the diameter of associated rollers by carving predetermined portions to define a pair of recessed, arc-shaped guide surfaces 1a, 1a extending substantially perpendicular to each other. Each of the recessed, arc-shaped guide surfaces 1a, 1a formed in the present spherical spacer 1 is so shaped to partly receive therein an associated roller and the radius of curvature of this guide surface 1a is slightly larger than the radius of the associated roller. Thus, the associated roller may be maintained in a proper orientation since it is partly cradled in the space defined by the recessed, arc-shaped guide surface 1a of the spacer 1 and moreover the associated roller is free to rotate therein.

A pocket 1b is formed nearly at the center of each of the recessed, arc-shaped guide surfaces 1a in the form of a dent and it serves as a reservoir for reserving therein a quantity of lubricant, such as oil or grease. Although a through hole may be provided extending through the central portion of the spacer 1 between the pair of opposite recessed, arc-shaped guide surfaces 1a, 1a, the provision of such a pocket 1b in the form of a dent is preferred because of its higher structural integrity. It is to be noted that two or more such pockets may also be provided for each or one of the pair of recessed, arc-shaped guide surfaces 1a, and, if desired, one or more through holes may also be provided extending through the central portion of the present spacer 1 between the pair of opposite recessed, arc-shaped guide surfaces 1a in place of or in addition to pockets 1b in the form of a dent.

In the embodiment shown in FIG. 1, each of the recessed, arc-shaped guide surfaces 1a is in the form of a curved surface defined by removing a predetermined portion of a spherical body. As an alternative, the guide surface 1a may be provided with a notch or cut-away portion at one or each end thereof in a longitudinal direction so as to reduce the area of the guide surface 1a which comes into rolling contact with an associated roller and thus the sliding resistance between the spacer 1 and its associated roller. Although not shown specifically in FIG. 1, such a notch or cut-away portion may, for example, be provided at the top and/or bottom of the guide surface 1a as a further recess.

The present spacer 1 shown in FIG. 1 is also provided with a position marker 1c at a predetermined location of its outer spherical surface 1d. The position marker 1c indicates the orientation of the spacer 1 so that this marker 1c may be advantageously used when assembling the present spacer 1 into a crossed roller bearing assembly, together with associated rollers. Such a marker 1c may be formed in any desired manner, but in the illustrated embodiment, the marker 1c is defined in the form of a local flat portion. The provision of such a marker 1c is particularly useful if the spacer 1 is so structured to have a particular orientation as in an embodiment which will be described below.

Figure 2:
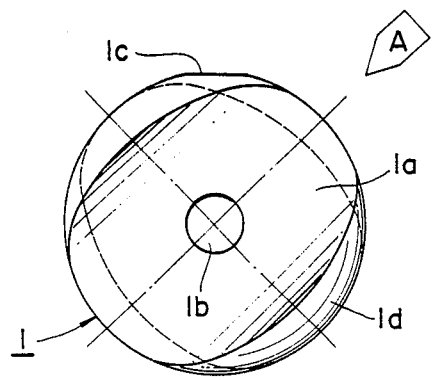
FIG. 2 is a schematic illustration showing in front view the overall structure of a spherical spacer for use in a rotating type crossed roller bearing assembly constructed in accordance with another embodiment of the present invention.
Figure 3:
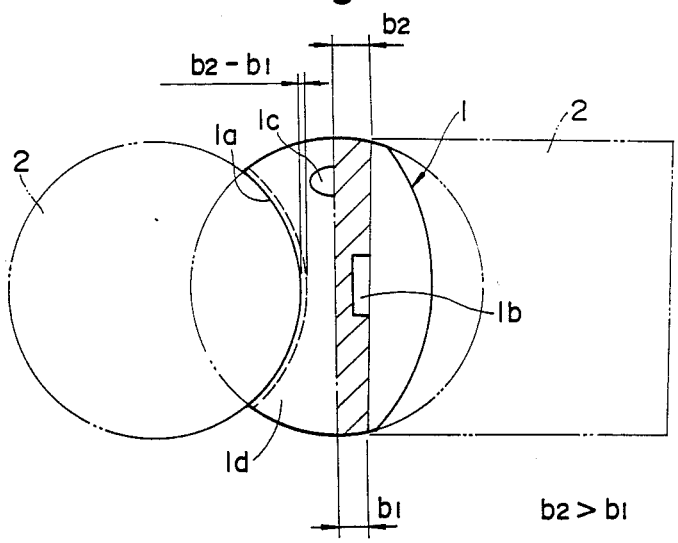
FIG. 3 is a schematic illustration showing the inclination of a recessed, arc-shaped guide surface of the spherical spacer shown in FIG. 2 with respect to its predetermined center line and a positional relationship with an adjacent roller 2.
Figure 4:
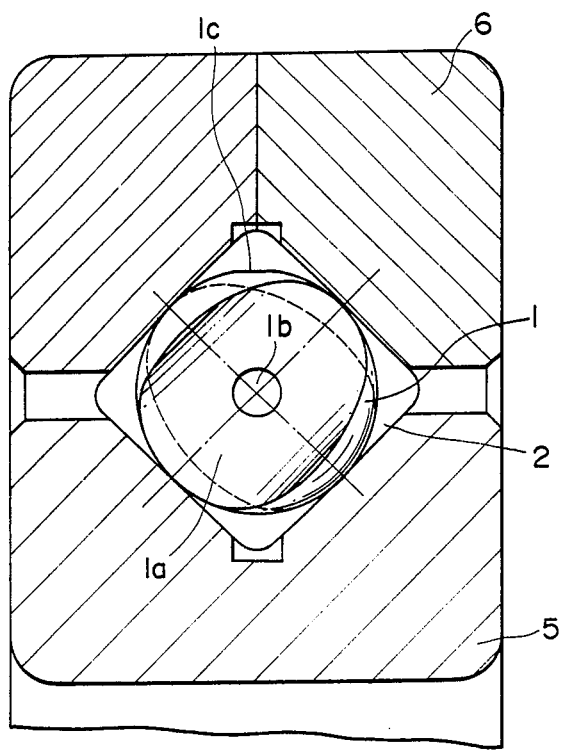
FIG. 4 is a schematic illustration showing how the spherical spacer of FIG. 2 is disposed in a guide channel defined in a rotating type crossed roller bearing assembly.

FIG. 2 shows another embodiment of the present spacer 1 for use in a crossed roller bearing assembly and it may be constructed by slightly modifying the structure shown in FIG. 1. Thus, the spacer 1 shown in FIG. 1 is structurally similar in many respects to the spacer 1 shown in FIG. 1. FIG. 3 illustrates an important aspect of the structure of the present spacer 1 and it also shows how the present spacer 1 partly embraces its associated roller 2. FIG. 4 illustrates the condition in which the present spacer 1 of FIG. 2 is fitted in a guide channel of a rotating type crossed roller bearing assembly. The important feature of the present spacer 1 shown in FIG. 2 resides in the fact that each of the guide surfaces 1a is inclined with respect to a hypothetical center line or plane extending through the center of the spacer 1. Described more in detail, as shown in FIG. 3, a hypothetical center plane may be defined by a plane which passes through the center of the spacer 1 and the center of the marker 1c as indicated by the one-dotted line in FIG. 3. The generatrix line of the guide surface 1a is axially inclined with respect to this hypothetical center plane because a distance b2 between the hypothetical center plane and the top end of the guide surface 1a is larger than a distance b1 between the hypothetical center plane and the bottom end of the guide surface 1a. Thus, it may be viewed such that the top portion of the spacer 1 is thicker than its bottom portion by a difference b2−b1. As a result, when an associated roller 2 is fitted into the inclined guide surface 1a as shown in FIG. 3, the roller 2 (left-hand) is maintained slightly inclined.

Such a structure is particularly advantages in an application to a rotating type crossed roller bearing assembly because it helps to define a circle when the present spacers 1 and rollers 2 are assembled together. That is, as shown in FIG. 2, the present spacer 1 has a pair of guide surfaces 1a slightly inclined with respect to a predetermined hypothetical center plane which passes through the center of the spacer 1 and the center of the marker 1c, the position of which is indicated by the arrow A. Thus, in FIG. 2, the predetermined hypothetical center plane of the spacer 1 corresponds to the plane of the drawing of FIG. 2. As shown in FIG. 2, the spacer 1 shows a top portion of the outer spherical surface 1d which is larger than its bottom portion of the outer spherical surface 1d, which indicates the fact that the guide surface 1a is inclined in a direction gradually separating away from the plane of the drawing from bottom left to top right in FIG. 2. The similar structure is also shown in FIG. 4.

Because of the unique structure of the present spacer 1, the following advantages, among other things, may be obtained.

(1) Since an associated roller is partly received in the space defined by the recessed, arc-shaped guide surface 1a of the spacer 1, the roller is maintained in an intended orientation positively so that the rotating axis of the roller is also maintained in an intended orientation and the roller may stably rotates around the rotating axis. Thus, the roller is well prevented from being skewed during operation.

(2) During assembling, gaps in the circumferential direction may be minimized.

(3) Since a large number of lubricant pockets may be disposed in the guide channel along a longitudinal axis thereof, an enhanced lubrication and cooling performance can be expected.

Also shown in FIG. 3 is the cross sectional shape of the pocket 1b provided in the spacer 1. As shown, the pocket 1b in the present embodiment is in the form of a dent. However, as set forth previously, a through hole extending through the central portion of the spacer 1 between the pair of opposite guide surfaces 1a may also be provided, if desired.

Figure 5:
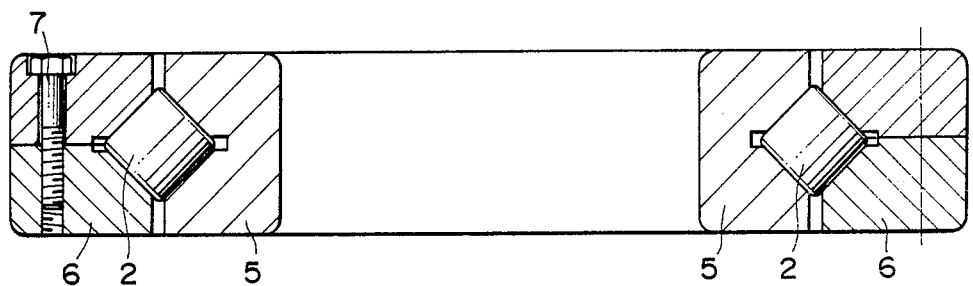
FIG. 5 is a schematic illustration showing in transverse cross section the overall structure of a rotating type crossed roller bearing assembly constructed in accordance with a further embodiment of the present invention employing spherical spacers each located between two adjacent rollers.

Referring now to FIG. 4, there is shown a rotating type rolling contact crossed roller bearing assembly constructed in accordance with one embodiment of the present invention using the spacer 1 shown in FIG. 2. FIG. 5 also shows the present bearing assembly, a part of which is shown in FIG. 4. The present bearing assembly includes an inner ring 5 and an outer ring 6 which are rotatable to each other. The inner ring 5 is formed with a generally V-shaped inner guide groove around and in its outer peripheral surface and the outer ring 6 is formed with a generally V-shaped outer guide groove around and in its inner peripheral surface. These inner and outer guide grooves face each other to define an annular guide channel having a generally square cross section between the inner and outer rings 5 and 6. A plurality of cylindrical rollers 2 having a diameter equal to its height are provided in the annular guide channel in a crossed arrangement between any two adjacent ones. In addition, a plurality of spacers 1 are also provided in the annular guide channel with each of them located between any two adjacent ones of the plurality of rollers 2. As may be understood, the spacer 1 with inclined guide surfaces 1a is particularly advantageous for use in the present bearing assembly.

As shown in FIGS. 4 and 5, in the present bearing assembly, the outer ring 6 has a split structure and thus it may be divided into left and right halves when disassembled. When assembled, the left and right half portions are combined, for example, by a bolt 7 as shown in FIG. 5. In assembling the present bearing assembly, a combination of a plurality of rollers 2 and spacers 1 is placed around the inner ring 2 and then the left and right half portions of the outer ring 6 are placed around the inner ring 5 and tightened together by the bolt 7.

Figure 6:
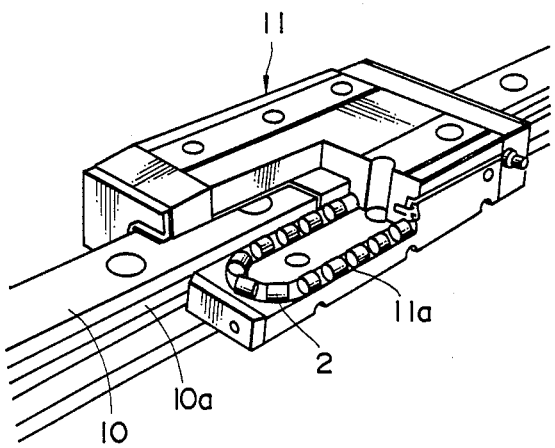
FIG. 6 is a schematic illustration showing in perspective the overall structure of a linear motion rolling contact crossed roller bearing assembly constructed in accordance with a still further embodiment of the present invention employing spherical spacers each located between two adjacent rollers.

FIG. 6 schematically illustrates a linear motion crossed roller rolling contact assembly or linear way constructed in accordance with another embodiment of the present invention using the present spacer 1. As shown, the present device includes a guide rail 10 extending straight over a desired length and a slider 11 which rides on and slides along the guide rail 10. The guide rail 10 is formed with a pair of straight guide grooves 10a on opposite side surfaces thereof, and the slider 11 is provided with a pair of endless circulating paths 11a, each including a load path section, a return path section and a pair of curved connecting path sections, each of which connects the corresponding ends of the load and return path sections, as well known in the art. As also well known in the art, the load path section is partly open and located opposite to the straight guide groove 10a of the guide rail 10.

A plurality of rollers 2 are provided in each of the endless circulating paths 11a in a crossed arrangement, i.e., with any two adjacent rollers having rotating axes extending perpendicular to each other when viewed in the direction of the longitudinal direction of the endless circulating path. Because of the complexity of showing the rollers 2 in proper orientation in the endless circulating path 11a of the slider 11, the rollers 2 are shown to be lying in the path in FIG. 6. It should be noted, however, that these rollers 2 must, in fact, be shown in a crossed arrangement such that any two adjacent rollers 2 having their rotating axes pointed in perpendicular directions when viewed in the direction of advancement of the rollers 2 in the endless circulating path 11a. The rollers 2 are not in direct contact from each other and a spacer 1 of the present invention is located between any two adjacent ones of the rollers 2 so that the rollers 2 in the endless circulating path 11a are spaced apart from each other. Such a linear motion rolling contact assembly can provide an extremely smooth relative motion between the rail 10 and the slider 11 since the sliding resistance of the rollers 2 which roll along the endless circulating path 11a is significantly reduced.

The present spacer 1, for example, shown in FIGS. 1 and 2 is preferably comprised of a plastic material by injection molding. Thus, the spacer 1 may be manufactured in mass and thus low at cost and moreover light in weight.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A spacer for use in a crossed roller bearing assembly including a plurality of rollers provided in a guide channel in a crossed arrangement, said spacer being located between any two adjacent ones of said plurality of rollers when used in said assembly, said spacer including a substantially spherical outer surface and a pair of recessed, arc-shaped guide surfaces which are located on opposite sides and which have generatrix lines extending perpendicular to each other.

2. The spacer of claim 1, wherein at least one of said pair of guide surfaces is inclined at a predetermined angle with respect to a predetermined hypothetical center plane passing through the center of said spacer.

3. The spacer of claim 1, further comprising a lubricant pocket formed in at least one of said pair of guide surfaces.

4. The spacer of claim 3, wherein said pocket is in the form of a dent.

5. The spacer of claim 3 wherein said pocket is located substantially at the center of said guide surface.

6. The spacer of claim 1, further comprising a positioning mark provided at a predetermined location on said outer peripheral surface.

7. The spacer of claim 6, wherein said positioning mark is a local flat portion formed on said outer peripheral surface.

8. The spacer of claim 1, wherein said spacer is comprised of a plastic material.

* * * * *